United States Patent
Agrawal et al.

(10) Patent No.: US 11,631,207 B2
(45) Date of Patent: Apr. 18, 2023

(54) VECTOR OBJECT STYLIZATION FROM RASTER OBJECTS

(71) Applicant: Adobe Inc., San Jose, CA (US)

(72) Inventors: Vivek Agrawal, Hooghly (IN); Tarun Beri, Noida (IN); Matthew David Fisher, Burlingame, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/470,148

(22) Filed: Sep. 9, 2021

(65) Prior Publication Data

US 2023/0072081 A1 Mar. 9, 2023

(51) Int. Cl.
  *G06T 11/60* (2006.01)
  *G06T 11/20* (2006.01)

(52) U.S. Cl.
  CPC ............ *G06T 11/60* (2013.01); *G06T 11/203* (2013.01); *G06T 2200/24* (2013.01)

(58) Field of Classification Search
  CPC ...................................................... G06T 11/60
  See application file for complete search history.

(56) References Cited

U.S. PATENT DOCUMENTS

| | | |
|---|---|---|
| 5,611,036 A | 3/1997 | Berend et al. |
| 5,861,889 A | 1/1999 | Wallace et al. |
| 5,894,310 A | 4/1999 | Arsenault et al. |
| 6,154,221 A | 11/2000 | Gangnet |
| 6,268,871 B1 | 7/2001 | Rice et al. |
| 6,441,823 B1 | 8/2002 | Ananya |
| 6,448,964 B1 | 9/2002 | Isaacs et al. |
| 6,781,597 B1 | 8/2004 | Vrobel et al. |
| 6,919,888 B1 | 7/2005 | Perani et al. |
| 7,196,707 B2 | 3/2007 | Davignon |
| 7,218,326 B1 | 5/2007 | Bogues et al. |
| 7,302,650 B1 | 11/2007 | Allyn et al. |
| 7,496,416 B2 | 2/2009 | Ferguson et al. |
| 7,868,887 B1 | 1/2011 | Yhann |
| 7,884,834 B2 | 2/2011 | Mouilleseaux et al. |

(Continued)

FOREIGN PATENT DOCUMENTS

EP 2530623 12/2012

OTHER PUBLICATIONS

H. S. M. Al-Khaffaf, A. Z. Talib, W. M. N. W. Zainon and M. A. Osman, "A framework for objective performance evaluation for digital font reconstruction," 2016 SAI Computing Conference (SAI), 2016, pp. 369-372, doi: 10.1109/SAI.2016.7556008. (Year: 2016).*

(Continued)

*Primary Examiner* — Shivang I Patel
(74) *Attorney, Agent, or Firm* — FIG. 1 Patents

(57) ABSTRACT

Vector object stylization techniques from raster objects are described that support editing of vector objects in a manner that maintains an underlying mathematical representation of object. A raster object, for instance, is generated from an edited version of an output of a vector object. This raster object, along with the vector object are received as inputs by a vector conversion system. These inputs are utilized by the vector conversion system to generate a stylized vector object having a visual appearance that mimics and simulates a visual appearance of the raster object. As a result, the stylized vector object provides a mathematical representation of the raster object.

20 Claims, 12 Drawing Sheets

(56) References Cited

U.S. PATENT DOCUMENTS

| | | | |
|---|---|---|---|
| 8,004,539 | B2 | 8/2011 | McDaniel et al. |
| 8,373,704 | B1 | 2/2013 | Mueller |
| 8,629,871 | B2 | 1/2014 | O'Brien et al. |
| 8,830,226 | B2 | 9/2014 | Goossens |
| 8,994,736 | B2 | 3/2015 | Carr et al. |
| 9,024,938 | B2 | 5/2015 | Joshi |
| 9,454,797 | B2 | 9/2016 | Popovic et al. |
| 10,388,045 | B2 | 8/2019 | Batra et al. |
| 10,410,317 | B1 | 9/2019 | Phogat et al. |
| 10,510,186 | B2 | 12/2019 | Batra et al. |
| 10,832,446 | B2 | 11/2020 | Phogat et al. |
| 10,878,604 | B2 | 12/2020 | Batra et al. |
| 10,943,375 | B2 | 3/2021 | Phogat et al. |
| 11,037,367 | B2 | 6/2021 | Batra et al. |
| 2003/0033050 | A1 | 2/2003 | Yutkowitz |
| 2005/0237325 | A1 | 10/2005 | Motter et al. |
| 2007/0038421 | A1 | 2/2007 | Hu et al. |
| 2009/0213143 | A1 | 8/2009 | Igarashi |
| 2010/0189362 | A1* | 7/2010 | Jakubiak .............. G06F 40/129 382/203 |
| 2010/0214312 | A1 | 8/2010 | Weber et al. |
| 2012/0154397 | A1 | 6/2012 | Chernikov et al. |
| 2013/0120457 | A1 | 5/2013 | Popovic et al. |
| 2013/0300736 | A1 | 11/2013 | Schmidt |
| 2014/0104266 | A1 | 4/2014 | Stone et al. |
| 2014/0168270 | A1 | 6/2014 | Choy et al. |
| 2015/0022517 | A1 | 1/2015 | Jutan et al. |
| 2015/0287210 | A1 | 10/2015 | Song et al. |
| 2018/0040169 | A1 | 2/2018 | Nakagawa |
| 2018/0061092 | A1 | 3/2018 | Sasikumar et al. |
| 2018/0061093 | A1 | 3/2018 | Ning |
| 2019/0197771 | A1 | 6/2019 | Batra et al. |
| 2019/0206100 | A1 | 7/2019 | Batra et al. |
| 2019/0279406 | A1 | 9/2019 | Batra et al. |
| 2019/0295217 | A1 | 9/2019 | Phogat et al. |
| 2019/0318523 | A1 | 10/2019 | Higginbottom |
| 2020/0066038 | A1 | 2/2020 | Batra et al. |
| 2020/0219287 | A1 | 7/2020 | Phogat et al. |
| 2020/0334874 | A1 | 10/2020 | Phogat et al. |
| 2021/0141464 | A1* | 5/2021 | Jain .................. G06F 3/0236 |

OTHER PUBLICATIONS

"Adobe Illustrator CC Tutorials", Retrieved at: https://helpx.adobe.com/in/illustrator/how-to/dynamic-symbols.html—on Jan. 8, 2019, 8 pages.

"Barycentric coordinate system—Wikipedia", https://en.wikipedia.org/wiki/Barycentric_coordinate_system—Retrieved on Oct. 11, 2017, 9 pages.

"Bounding volume hierarchy—Wikipedia", https://en.wikipedia.org/wiki/Bounding_volume_hierarchy—Retrieved on Oct. 11, 2017, 3 pages.

"Combined Search and Examination Report", GB Application No. 1816796.5, dated Apr. 17, 2019, 5 pages.

"Corrected Notice of Allowability", U.S. Appl. No. 16/387,186, dated Oct. 30, 2020, 12 pages.

"Corrected Notice of Allowability", U.S. Appl. No. 16/241,719, dated Sep. 29, 2020, 2 pages.

"Corrected Notice of Allowability", U.S. Appl. No. 16/387,186, dated Dec. 28, 2020, 2 pages.

"Final Office Action", U.S. Appl. No. 16/674,931, dated Sep. 1, 2020, 13 pages.

"Final Office Action", U.S. Appl. No. 15/852,924, dated Apr. 30, 2019, 17 pages.

"First Action Interview Office Action", U.S. Appl. No. 16/674,931, dated Apr. 10, 2020, 3 pages.

"First Action Interview Office Action", U.S. Appl. No. 16/427,005, dated Jul. 13, 2020, 3 pages.

"First Action Interview Office Action", U.S. Appl. No. 16/387,186, dated Sep. 11, 2020, 3 pages.

"First Action Interview Office Action", U.S. Appl. No. 15/936,299, dated Jan. 18, 2019, 4 pages.

"First Action Interview Office Action", U.S. Appl. No. 16/241,719, dated Mar. 17, 2020, 4 pages.

"First Action Interview Office Action", U.S. Appl. No. 15/852,924, dated Oct. 11, 2018, 5 pages.

"Kabsch algorithm—Wikipedia", Retrieved at: https://en.wikipedia.org/wiki/Kabsch_algorithm—Sep. 27, 2017, 4 pages.

"Notice of Allowance", U.S. Appl. No. 16/241,719, dated Jun. 22, 2020, 11 pages.

"Notice of Allowance", U.S. Appl. No. 16/427,005, dated Jul. 31, 2020, 12 pages.

"Notice of Allowance", U.S. Appl. No. 16/387,186, dated Oct. 20, 2020, 13 pages.

"Notice of Allowance", U.S. Appl. No. 15/861,908, dated Apr. 3, 2019, 14 pages.

"Notice of Allowance", U.S. Appl. No. 16/674,931, dated Mar. 8, 2021, 8 pages.

"Notice of Allowance", U.S. Appl. No. 15/852,924, dated Aug. 2, 2019, 8 pages.

"Notice of Allowance", U.S. Appl. No. 15/936,299, dated May 3, 2019, 9 pages.

"Pre-Interview First Office Action", U.S. Appl. No. 15/861,908, dated Jan. 18, 2019, 22 pages.

"Pre-Interview First Office Action", U.S. Appl. No. 16/427,005, dated May 20, 2020, 23 pages.

"Pre-Interview First Office Action", U.S. Appl. No. 16/674,931, dated Feb. 20, 2020, 3 pages.

"Pre-Interview First Office Action", U.S. Appl. No. 16/241,719, dated Feb. 5, 2020, 39 pages.

"Pre-Interview First Office Action", U.S. Appl. No. 15/852,924, dated Jul. 27, 2018, 4 pages.

"Pre-Interview First Office Action", U.S. Appl. No. 15/936,299, dated Sep. 21, 2018, 4 pages.

"Pre-Interview First Office Action", U.S. Appl. No. 16/387,186, dated Jul. 13, 2020, 8 pages.

"Ramer-Douglas-Peucker algorithm—Wikipedia", https://en.wikipedia.org/wiki/Ramer%E2%80%93Douglas%E2%80%93Peucker_algorithm—Retrieved on Oct. 11, 2017, 4 pages.

"Supplemental Notice of Allowability", U.S. Appl. No. 16/241,719, dated Jun. 26, 2020, 2 pages.

Aoki, Haruka et al., "Few-Shot Font Generation with Deep Metric Learning", 2020 25th International Conference on Pattern Recognition [retrieved Jul. 28, 2021]. Retrieved from the Internet <https://arxiv.org/pdf/2011.02206.pdf>., Jan. 10, 2021, 8 Pages.

Au, Oscar K. et al., "Skeleton Extraction by Mesh Contraction", ACM Trans. Graph., 27(3):44:1{44:10,, Aug. 2008, 10 pages.

Batra, Vineet et al., "Digital Media Environment for Intuitive Modifications of Digital Graphics", U.S. Appl. No. 15/852,924, filed Dec. 22, 2017, 60 pages.

Batra, Vineet et al., "Generating a Triangle Mesh For An Image Represented By Curves", U.S. Appl. No. 15/861,908, filed Jan. 4, 2018, 80 pages.

Batra, Vineet et al., "Generating a Triangle Mesh for an Image Represented by Curves", U.S. Appl. No. 15/861,908, filed Jan. 4, 2018, 93 pages.

Boye, Simon et al., "A Vectorial Solver for Free-form Vector Gradient", ACM Trans. Graph. 31, 6, Article 173, Sep. 17, 2012, 10 pages.

Bradski, Gary et al., "The OpenCV Library", Dr. Dobb's, The World of Software Development Blog [retrieved Jul. 28, 2021]. Retrieved from the Internet <https://www.drdobbs.com/open-source/the-opencv-Tibrary/184404319>., Nov. 1, 2000, 7 pages.

Cohen-Steiner, David , "Conforming Delaunay Triangulation in 3D", Jun. 2004, pp. 217-233.

De Goes, Fernando et al., "Vector Field Processing on Triangle Meshes", In SIGGRAPH Asia 2015 Courses (SA '15), Nov. 2, 2015, 49 pages.

Hayashi, Hideaki et al., "GlyphGAN: Style-consistent font generation based on generative adversarial networks", Knowledge-Based Systems, vol. 186 [retrieved Jul. 28, 2021]. Retrieved from the Internet <https://www.researchgate.net/publication/335132315_GlyphGAN_Style-consistent_font_generation_based_on_generative_adversarial_networks>., Dec. 15, 2019, 28 Pages.

(56) References Cited

OTHER PUBLICATIONS

Huynh, Lisa et al., "Bijective Deformations in Rn via Integral Curve Coordinates", May 1, 2015, 11 pages.
Igarashi, Takeo et al., "As-Rigid-As-Possible Shape Manipulation", ACM Transactions on Graphics 2005, Aug. 2005, 1134-1141.
Jacobson, Alec et al., "Bounded Biharmonic Weights for Real-Time Deformation", In ACM SIGGRAPH 2011 Papers, SIGGRAPH '11 [retrieved on Aug. 31, 2021]. Retrieved from the Internet <https://igl.ethz.ch/projects/bbw/bounded-biharmonic-weights-siggraph-2011-compressed-jacobson-et-al.pdf>., Jul. 2011, 8 pages.
Jacobson, Alec et al., "Fast Automatic Skinning Transformations", ACM Trans. Graph. 31,, Jul. 2012, 10 pages.
Karni, Zachi et al., "Spectral Compression of Mesh Geometry", Jul. 2000, 8 pages.
Komerska, Rick et al., "Haptic Gdraw: A fun and Easy to Use 3D Haptically Enhanced Sculpting Program", EuroHaptics 2004, Jun. 2004, 6 pages.
Liu, Songrun et al., "Skinning Cubic B'ezier Splines and Catmull-Clark Subdivision Surfaces", ACM Trans. Graph. 33, 6, Article 190, Nov. 19, 2014, 9 pages.
Liu, Songrun et al., "Skinning Cubic B'ezier Splines and Catmull-Clark Subdivision Surfaces", ACM Trans. Graph., 33(6):190:1{190:9, Nov. 19, 2014, 9 pages.
Martins, Fabio D. , "Bezier Curve Quick Tips: Two Methods For Smooth Curves", Posted Sep. 16, 2014; https://learn.scannerlicker.net/2014/09/16/bezier-curve-quick-tips-two-methods-for-smooth-curves/, Sep. 16, 2014, 11 pages.
Meng, Weiliang et al., "Interactive Image Deformation Using Cage Coordinates On GPU", Jan. 2009, pp. 119-126.
Müller, Meinard , "Dynamic time warping", In: Information Retrieval for Music and Motion. Springer, Berlin, Heidelberg [retrieved Jul. 28, 2021]. Retrieved from the Internet <https://www.researchgate.net/publication/285279006_Dynamic_time_warping>., Jan. 2007, 17 Pages.
Phogat, Ankit et al., "Bone Handle Generation", U.S. Appl. No. 16/241,719, filed Jan. 7, 2018, 42 pages.
Phogat, Ankit et al., "Digital Image Transformation Environment using Spline Handles", U.S. Appl. No. 15/936,299, filed Mar. 26, 2018, 42 pages.
Schaefer, Scott et al., "Image Deformation Using Moving Least Squares", SIGGRAPH, 25(3), Aug. 2006, 8 pages.
Schneider, Philip J. et al., "An Algorithm for Automatically Fitting Digitized Curves", Academic Press Professional, Inc., San Diego, CA, USA, 1990., Aug. 1, 1990, pp. 612-626.
Shewchuk, Jonathan R. , "Triangle: Engineering a 2D Quality Mesh Generator and Delaunay Triangulator", Workshop on Applied Computational Geometry. Springer, Berlin [retrieved Apr. 13, 2021]. Retrieved from the Internet <https://doi.org/10.1007/BFb0014497>., May 1996, 10 pages.
Sorkine, O et al., "Laplacian Surface Editing", Jul. 2004, 10 pages.
Visvalingam, M et al., "The Douglas-Peuker Algorithm for Line Simplification: Re-evaluation through Visualization", Sep. 1990, pp. 213-228.
Wang, Yizhi et al., "Attribute2Font: creating fonts you want from attributes", ACM Transactions on Graphics, vol. 39, No. 4 [retrieved Nov. 16, 2021] Retrieved from the Internet <https://www.researchgate.net/publication/341423467_Attribute2Font_Creating_Fonts_You_Want_From_Attributes>., Jun. 2020, 15 Pages.
Weng, Yanlin et al., "Sketching MLS Image Deformations on the GPU", Pacific Graphics 2008, vol. 27, Oct. 2008, 1789-1796.

\* cited by examiner

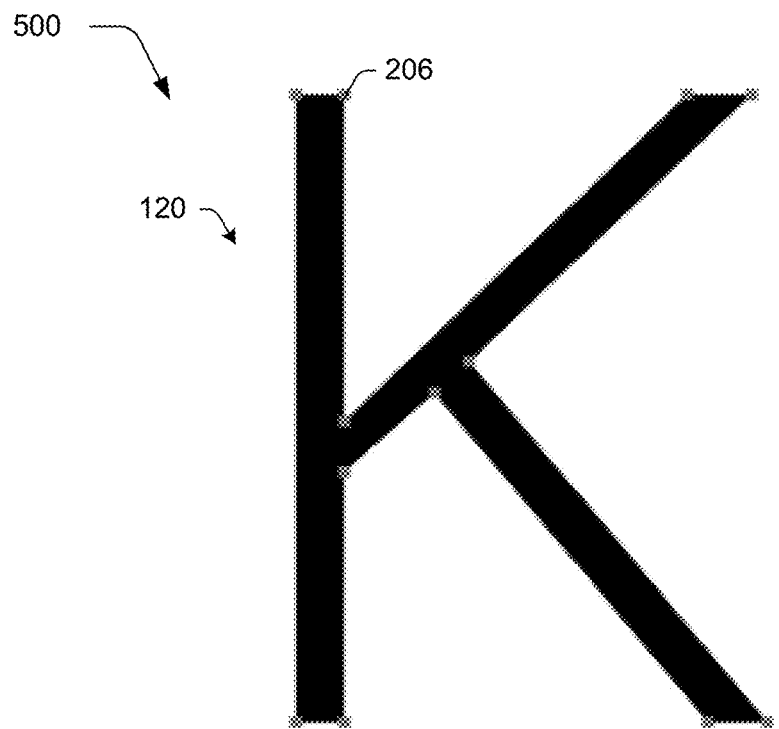
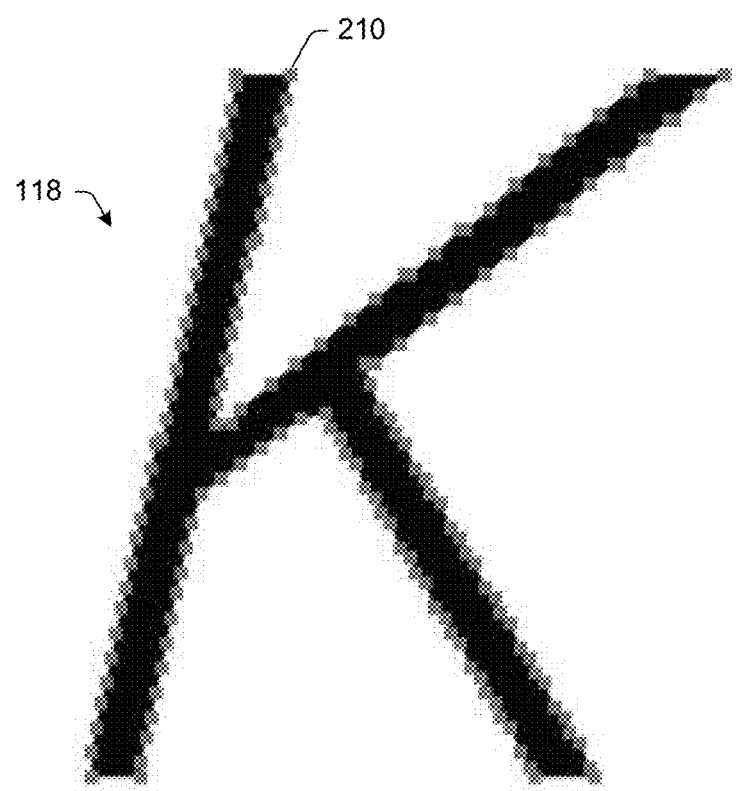
Fig. 5

VECTOR OBJECT STYLIZATION FROM RASTER OBJECTS

BACKGROUND

Vector objects are used to create a wide range of digital content due to the flexibility and accuracy in portraying the objects when rendered for display by a display device. Vector objects are mathematically generated using paths defined by start and end points, rather than as a collection of pixels. This enables vector objects to be scaled and modified by a computing device without a loss in visual quality. As such, vector objects are employed for a variety of purposes, a notable example of which includes vector glyphs of a font to represent letters, numbers, and other symbols of the font.

Functionality used to define vector objects mathematically, however, introduces challenges when editing the vector objects, e.g., to apply stylization. Conventional techniques used to do so typically rely on edits made to a rendered output of the vector object. As such, these edits are made to a rasterized version of the object and are not applicable to the vector object, itself. Consequently, conventional techniques, when editing an output of a vector object, lose the underlying functionality provided by mathematical definition of the object, and thus are frustrating, lack accuracy, and are susceptible to limitations of rasterization introduced by defining the object by individual pixels.

SUMMARY

Vector object stylization techniques from raster objects are described that support editing (e.g., stylization) of vector objects in a manner that maintains an underlying mathematical representation of object, e.g., as paths that are defined using Bezier curves. A raster object, for instance, is generated from an edited version of an output of a vector object. This raster object, along with the vector object are received as inputs by a vector conversion system. These inputs are utilized by the vector conversion system to generate a stylized vector object having a visual appearance that mimics and simulates a visual appearance of the raster object. As a result, the stylized vector object provides a mathematical representation of the raster object, and as such, overcomes the limitations of conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 5 depicts an example of curves and contours extracted from a vector object and raster object, respectively.

DETAILED DESCRIPTION

Overview

Figure 1:
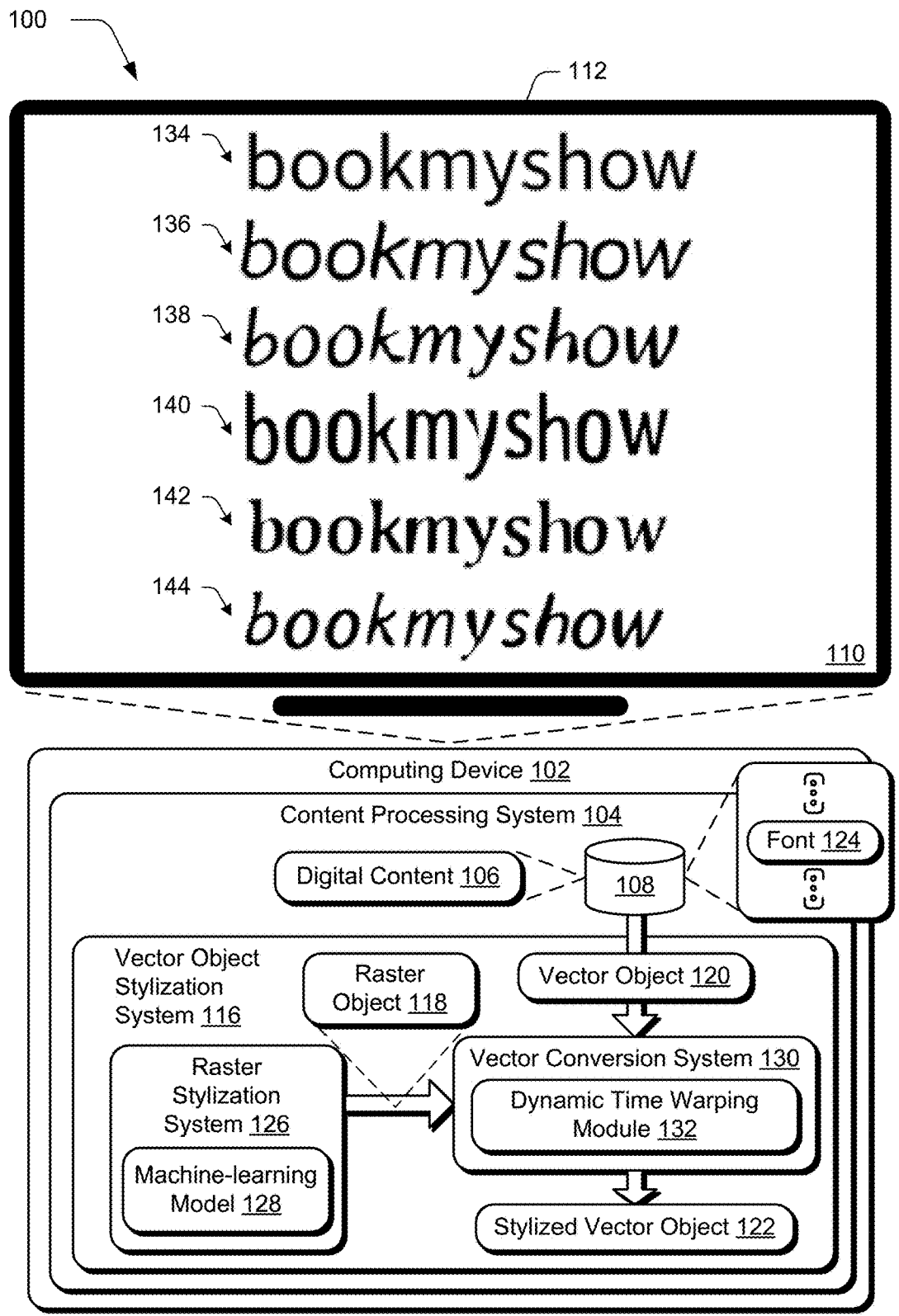
FIG. 1 is an illustration of an environment in an example implementation that is operable to employ vector object stylization techniques described herein.

Digital content creation often involves imparting a unique style and creativity to objects included as part of the digital content. However, conventional techniques to perform editing to impart stylization are limited and challenged when confronted with vector objects. Vector objects are defined mathematically (e.g., as a collection of Bezier curves) to include paths that are rendered for output, e.g., for display in a user interface, onto a physical medium, and so forth. However, conventional techniques used to perform this stylization are made in relation to a rendered output of the vector object, i.e., to pixels of a raster object. As such, conventional techniques lose the underlying mathematical structure and cause these edits to forgo the advantages made possible by vector objects involving resizing and crispness of display.

In a font example, edits made to glyphs of the font are made to a raster object rendered from a corresponding vector object used to represent the glyph, which is referred to as "vector glyphs." Raster objects, however, are imperfect, do not support further textual edits, lose resolution independence and vector crispness and as such are considered unacceptable by font designers. Consequently, these edits lose the underlying functionality made possible through mathematical representation of the glyph as a vector object.

Accordingly, vector object stylization techniques from raster objects are described that overcome these challenges and limitations to support editing (e.g., stylization) of vector objects in a manner that maintains an underlying mathematical representation of object, e.g., as paths that are defined using Bezier curves. Consider an example in which a vector object is used to represent a glyph of a font, which is therefore referred to as a "vector glyph." Edits are made to a rendered output of the vector glyphs to impart stylization. In one example, this is performed responsive to user inputs received via a user interface, e.g., to change widths, impart gradients, italicize, and so forth. In another example this is performed, automatically and without user intervention, through machine learning to apply artistic styles to this output, such as to impart semantic stylizations such as comic, sad, happy, and so on. In both examples, this results in a raster object that is a stylized version of the vector object.

The raster object, along with the vector object (which is a vector glyph in this example), are received as inputs by a vector conversion system. These inputs are utilized by the vector conversion system to generate a stylized vector object having a visual appearance that mimics and simulates a visual appearance of the raster object. To do so, a path generation module is employed to generate constituent paths that are used to form the vector object. A contour detection module is also employed to approximate contours from the raster object. The contour detection module, for instance, detects a boundary between pixels of the raster object and pixels in a background, e.g., of a user interface, digital image, and so forth. The boundary is converted into contours as a series of connected line segments as an approximation of a shape exhibited by pixels of the raster object.

The paths and the contours are received as an input by a correspondence detection module of the vector conversion system. The correspondence detection module is configured to determine which paths correspond with which contours. This determination, for instance, is based on locations and sizes of the paths and contours, respectively. This is used to form a list indicating correspondence between paths and contours.

A transformation generation module is then used by the vector conversion system to generate a transformation using the corresponding paths and contours. The transformation defines a mapping between the paths and the contours such that the paths taken from the vector object approximate the contours taken from the raster object. To do so, a set of points is sampled from a respective path and a set of points is sampled from a corresponding contour. The transformation is then generated as a mapping of the set of points from the path to the set of points from the contours.

In an implementation, a number of points in each set differs and thus conventional one-to-one mapping techniques fail. To address this, dynamic time warping is employed by the transformation generation module which operates as a one-to-many mapping between these sets. The points are specified using location data that specifies an actual location of the point, e.g., using X/Y coordinates. However, in practice use of the actual location of these points introduces visual artifacts when used, directly, to generate this mapping. To address this, hyperparameters are used from the location data, examples of which include gradients (e.g., to compute deviation from a previous point), angles (e.g., angle of tangents to path or contour), and so forth. In one example, this is performed for multiple iterations to generate a plurality of transformations and a selection is then made based on which transformation minimizes error. The error, for instance, is computed to determine how closely each transformation is usable when applied to a corresponding path to reproduce the corresponding contour. A variety of error detection techniques are contemplated, an example of which includes Root Mean Square Error (RMSE).

The transformation is then leveraged by a reconstruction module of the font stylization system to generate the stylized vector object. The transformation describes a mapping of each sampled point of the path to a corresponding sample point from contour of the raster object. As such, the contour as identified from a boundary of the raster object is an approximation and lacks accuracy. To address this, the sets of points sampled from the vector object are arranged curve by curve. The transformation is applied to obtain a sampled result curve, and a vector curve is generated using a curve fitting technique. In an implementation, line fitting is used for linear curves to rectify minor rasterization and contour defects. "Pure" curve fitting is used for each curve that is detected for non-linear curves, e.g., as an example of a quadratic or cubic Bezier curve.

Once these vector curves are generated, a stitching technique is utilized that includes a continuity constraint to ensure continuity between adjacent vector curves. The reconstruction module, for instance, ensures that "C0," "C1," and "G1" continuities are maintained. In an implementation, these reconstructions are also generated for a plurality of iterations and a stylized vector object is selected from a plurality of candidate vector objects based on which one minimizes error when compared with the raster object.

As a result, the stylized vector object provides a mathematical representation of the raster object, and as such, overcomes the limitations of conventional techniques. In a font scenario, for instance, the stylized vector object as a glyph is still usable as text, which is not possible in conventional techniques. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium vector object stylization environment 100 in an example implementation that is operable to employ vector object techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 14.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud." Digital content 106 is configurable in a variety of ways, examples of which include digital images, digital media, digital video, and any other form of content that is configured for rendering for display in a user interface 110 by a display device 112.

An example of functionality incorporated by the content processing system 104 to process the digital content 106 is illustrated as a vector object stylization system 116. This system is configured to convert a raster object 118 into a stylized vector object 122 and thus maintain functionality of a mathematical representation, e.g., for use as text. Vector objects 120 are utilized in a variety of different scenarios, examples of which include stock images, as vector glyphs of a font 124, objects in a user interface or webpage, and so forth.

In one example, the raster object 118 is generated as a stylized version of the vector object 120. A content creator, for instance, selects a vector glyph of a font 124, and from this, makes modifications through interaction with a user interface output by a raster stylization system 126. In another example, a machine-learning model 128 is employed to generate the stylized versions. The machine-learning model 128, for instance, is implemented responsive to user selection of options in a user interface such as "sad," "energetic," "antique," and so forth to apply these stylizations to the vector object 120, and from this, generate the raster object 118. Other examples are also contemplated, in which, the raster object 118 is not derived directly from a rendered output of the vector object 120. The vector object 120, for instance, may be selected (manually and/or automatically through object recognition implemented using machine learning) based on an appearance of the raster object 118 as a closest beginning approximation of the raster object 118.

Regardless of an origin of the raster object 118, a vector conversion system 130 is employed that accepts, as inputs, the raster object 118 and the vector object 120 and from this generates the stylized vector object 122. To perform these operations, the vector conversion system 130 employs a dynamic time warping module 132.

Dynamic time warping (DTW) provides a mechanism to compare two temporal sequences of possibly different lengths and which may lack synchronization with each other and find an optimal alignment of each of the points between their end-points, i.e., start and end points. Dynamic time warping thus addresses the challenges in addressing two sequences that are unequal in length and as such overcomes the limitations of a simple element-by-element Euclidean difference that is not meaningful in this scenario as it would altogether miss a part of the longer sequence.

Dynamic time warping supports a one-to-many mapping ensuring that features in a first sequence are matched with features in the second, e.g., troughs are matched to troughs, peaks are matched to peaks, plateaus to plateaus, and so on. The result is a non-linear warping path of minimum distance while proceeding from a first sequence to a second sequence. In one example, dynamic time warping assumes alignment of the start points and end points of both sequences, one to another, and the temporal sequences specify each of the points (i.e., data is not missing) at each of the time intervals in order of increasing time within the sequence.

The vector object stylization system 116 bridges a gap between raster-based stylizations and use as vector objects. By treating the input glyph as the state of the glyph object at time T1, and the coarsely defined contours (with contour detection) from the styled raster object as its state at a later time T2, the dynamic time warping module 132 generates a transformation as a time warping (or mapping) function from the former to the latter. The mapping function is optimized to produce the stylized vector object 122 to have an appearance that visually resembles the raster object 118. In other words, for every input vector object 120, a mapping function "f(G, S)→Y" is computed where "G" represents the input vector object 120, "S" is the stylized raster object 122, and "Y" is the output stylized vector object 122, such that the error between the raster of "Y" and "S" is minimized. In an implementation, the output stylized vector object 122 "Y" has the same number and topology of Bezier curves as the input vector object 120 "G," and thus there is no loss in crispness and preciseness of the output.

Accordingly, the techniques described herein support imparting artistic styles to vector objects (e.g., glyphs of a font 124) without causing a loss of foundational Bezier curves. In the illustrated example, input vector objects 134 are used to generate stylized vector objects 136, 138, 140, 142, 144 that maintain underlying mathematical representation of the input vector object 134. As such, the vector object stylization system 116 supports stylization of non-parametric fonts to impart abstract stylizations like comic, sad, delicate, and so on along with the other more common stylizations such as angular, weight, italics, and so on supported by parametric fonts. Further, the vector object stylization system 116 typically produces a same number of Bezier curves in the stylized vector object 122 as in the source. This differs from other techniques that generally produce a multitude of small paths that lack crispness. Further discussion of these and other techniques are included in the following section and shown using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Vector Object Stylization

Figure 2:
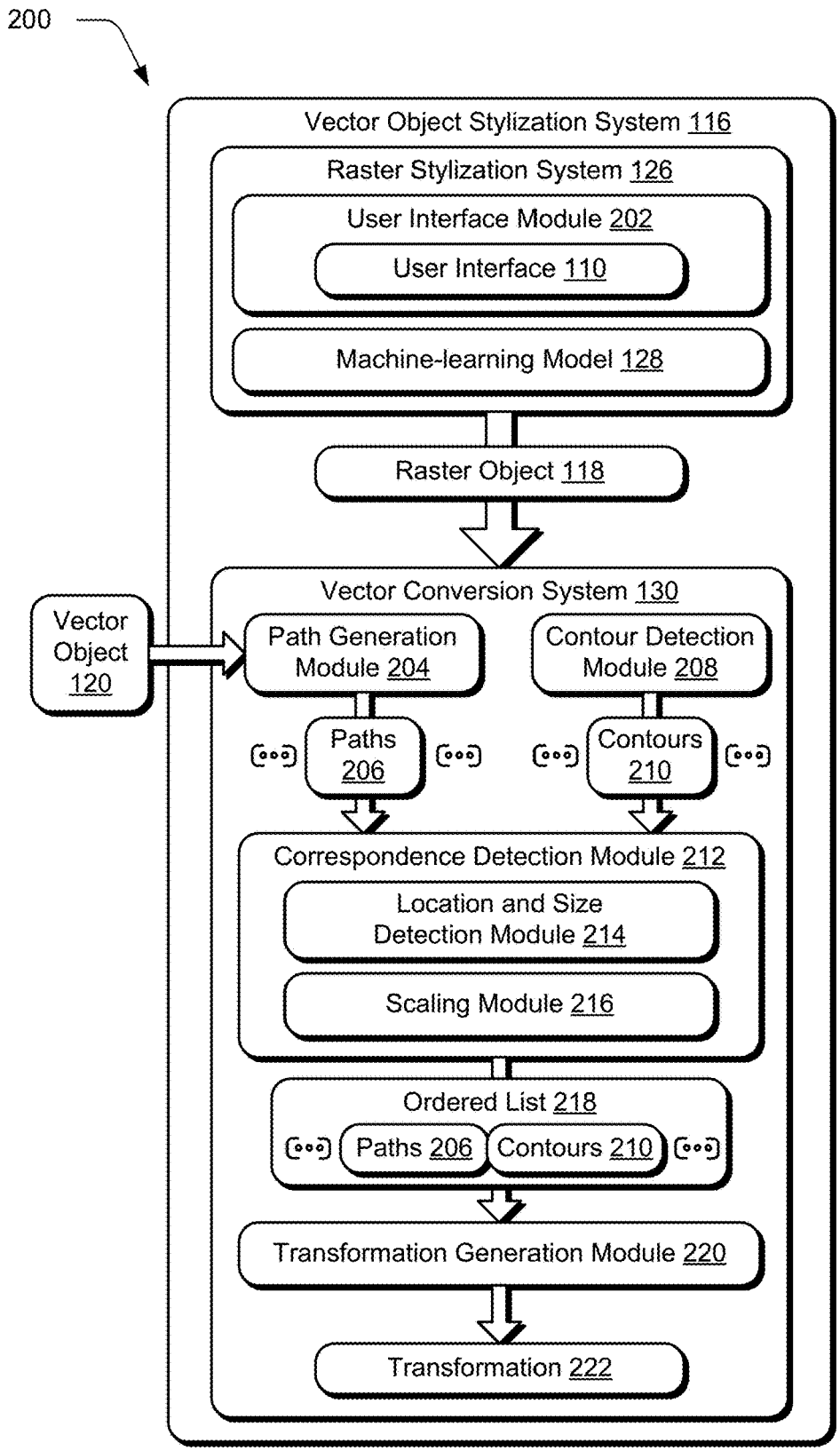
FIG. 2 depicts a system in an example implementation showing operation of a vector object stylization system of FIG. 1 in greater detail.
Figure 3:
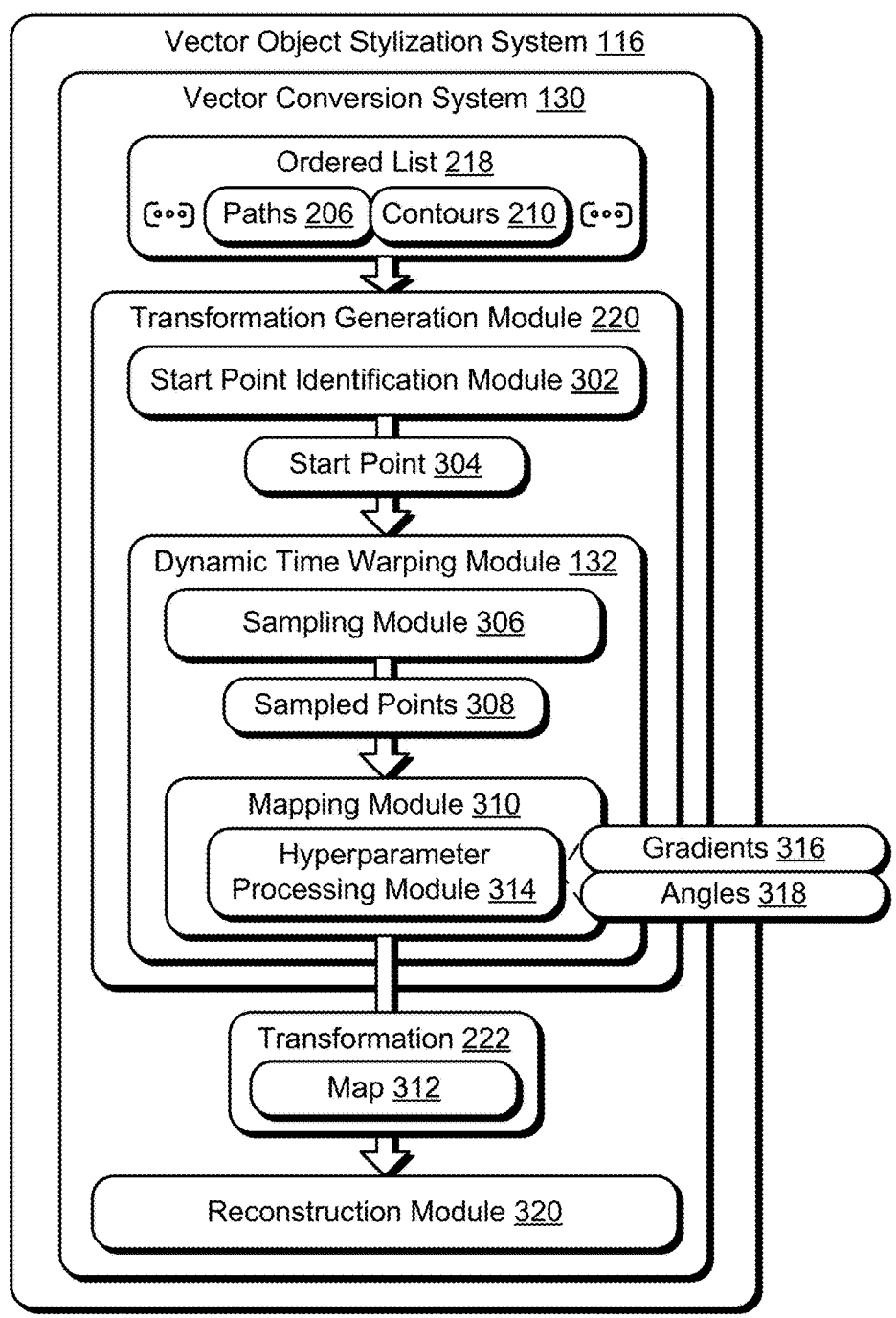
FIG. 3 depict a system showing operation of a transformation generation module of the vector object stylization system of FIG. 2 in greater detail.
Figure 4:
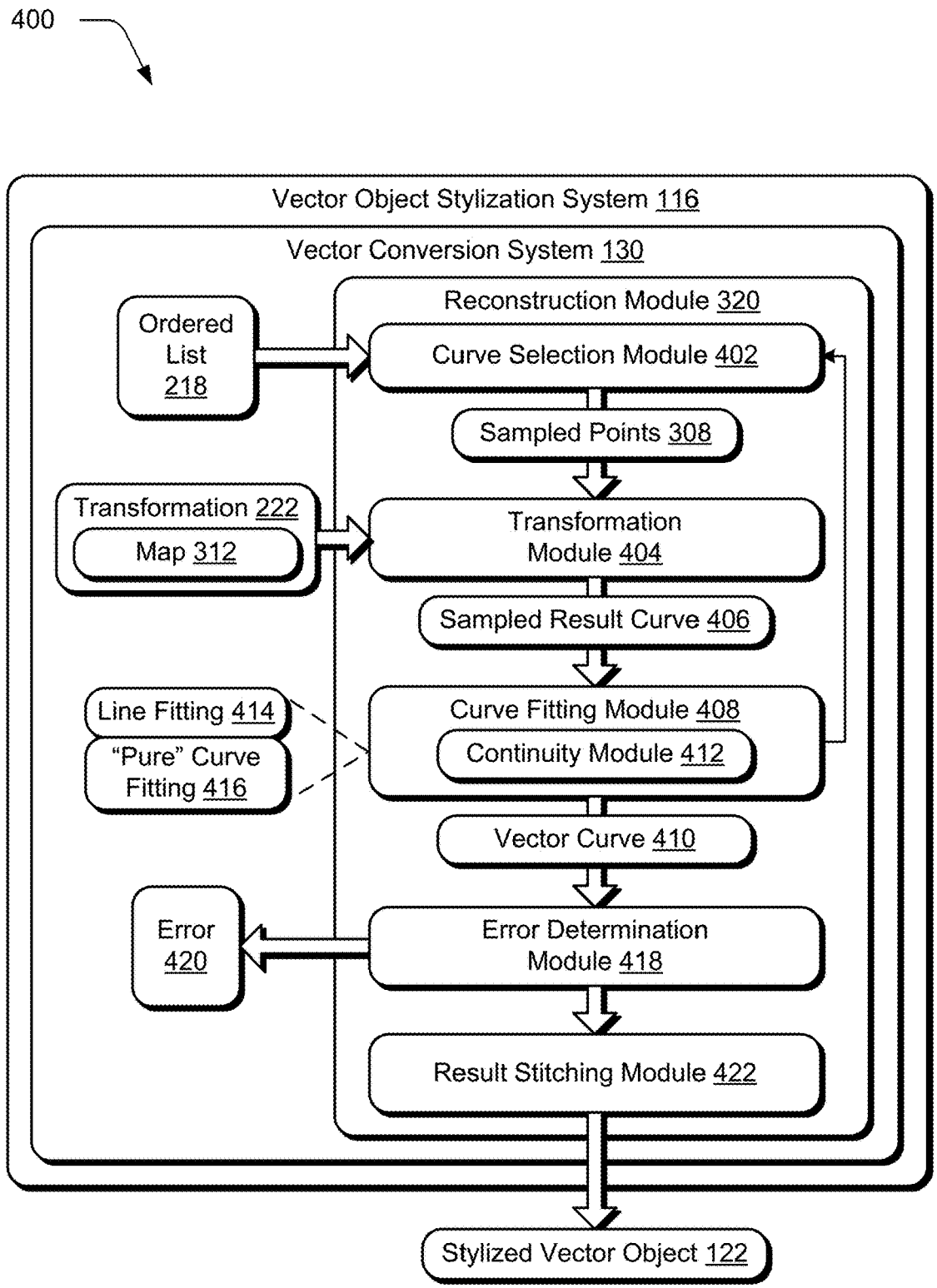
FIG. 4 depicts a system in an example implementation showing operation of a reconstruction module of FIG. 3 in greater detail.
Figure 6:
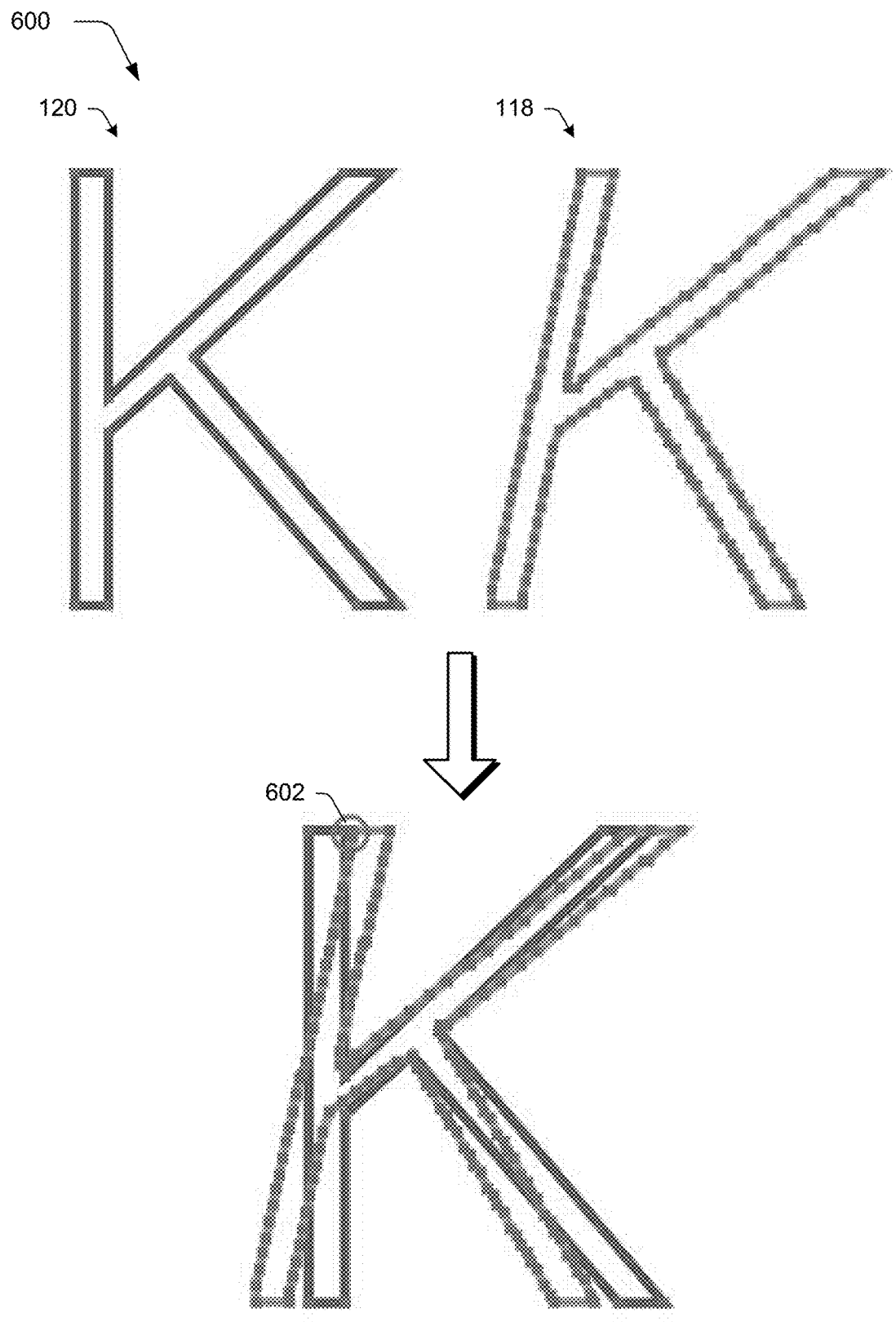
FIG. 6 depicts an example of closest point matching.
Figure 7:
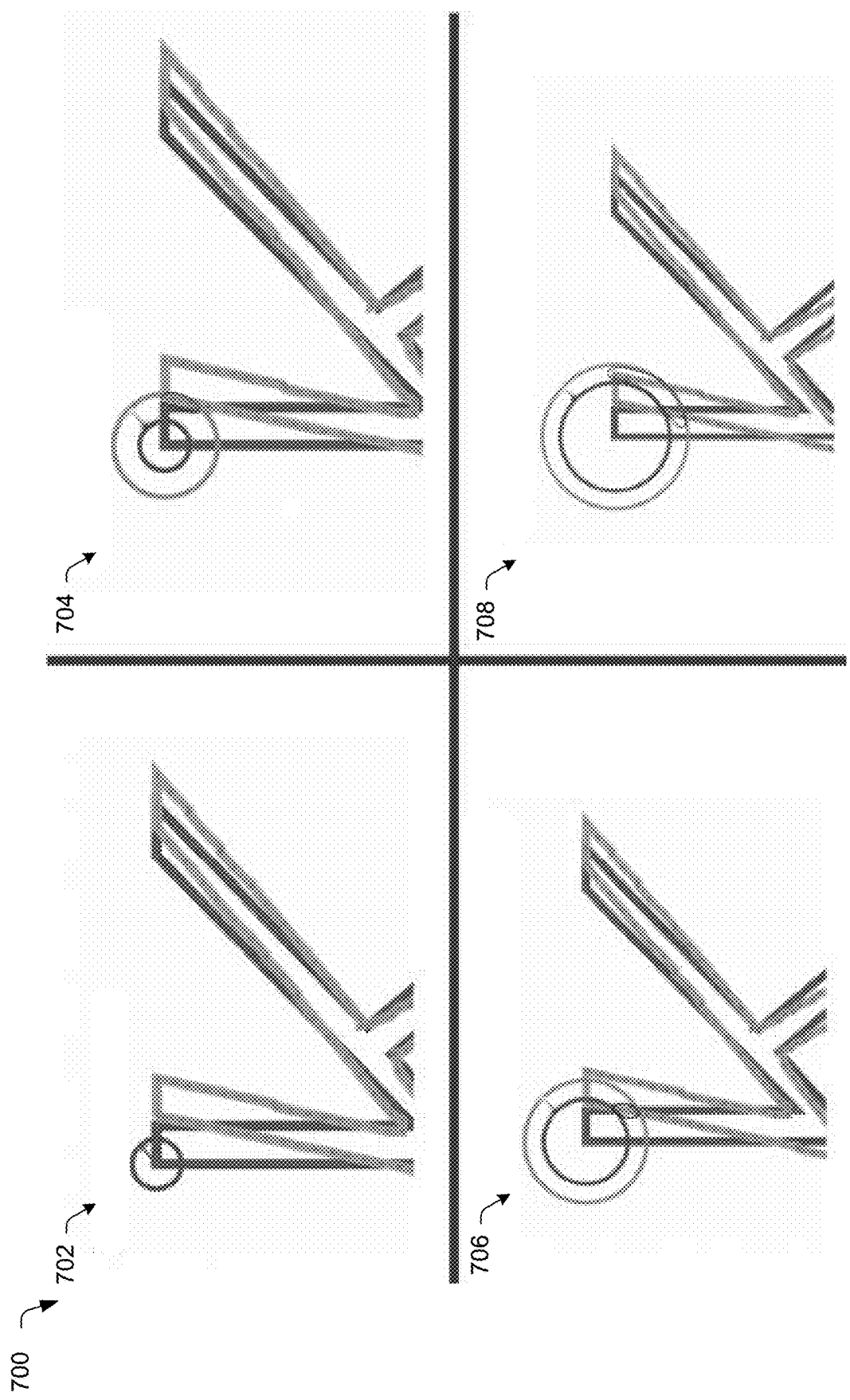
FIG. 7 depicts an example of progressive band closest point matching.
Figure 8:
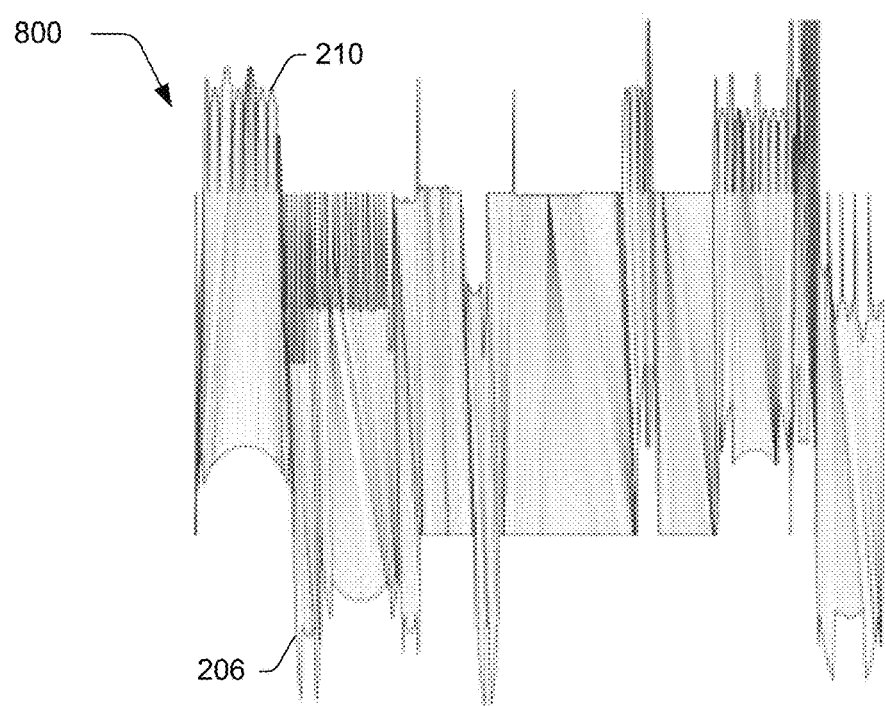
FIG. 8 depicts an example of mapping of X gradients between a curve of a vector object and a contour of a raster object, respectively.
Figure 9:
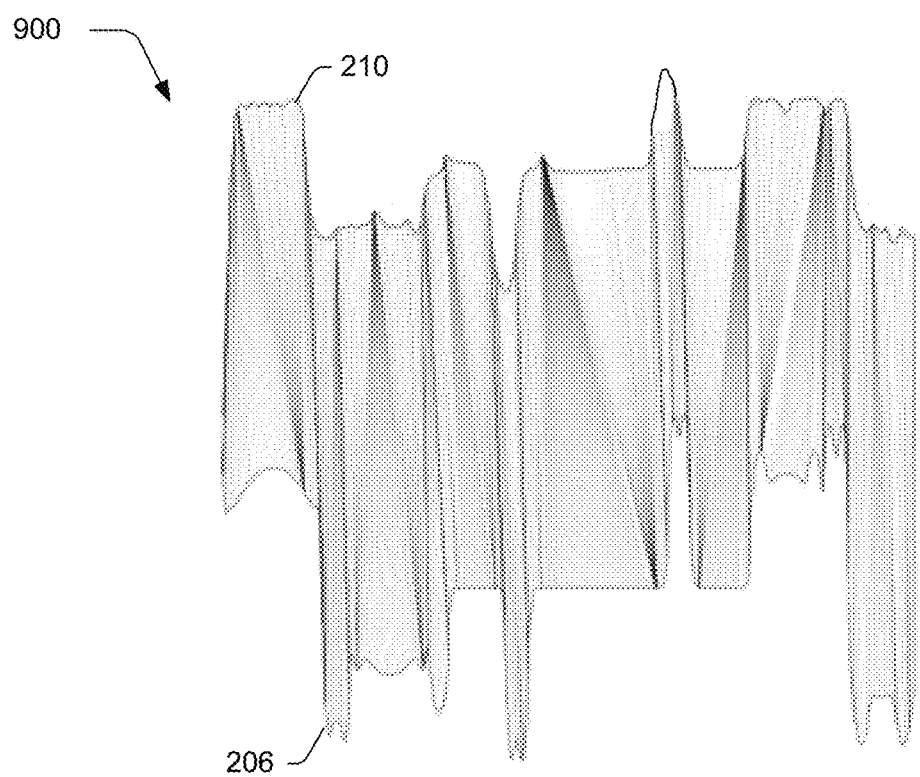
FIG. 9 depicts an example of mapping of smoothed gradients between curves of a vector object and contours of a raster object, respectively.
Figure 10:
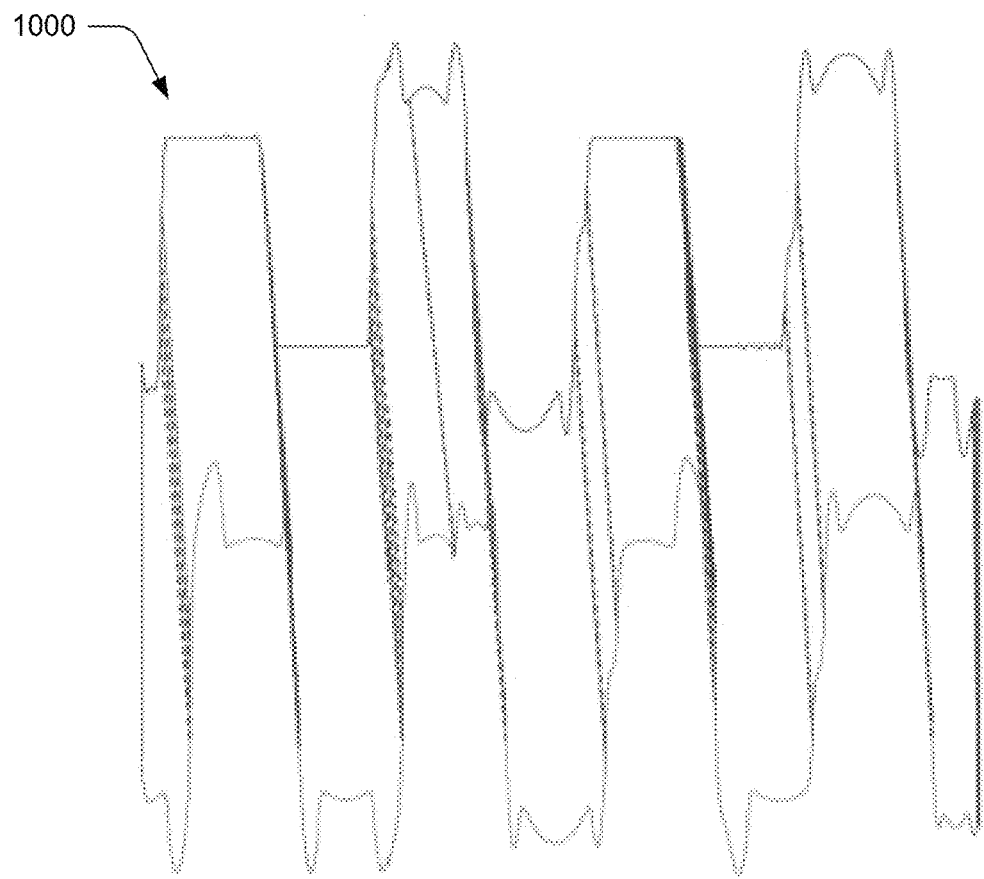
FIG. 10 depicts an example of a one-to-many mapping between a curve of a vector object and a contour of a raster object, respectively.
Figure 11:
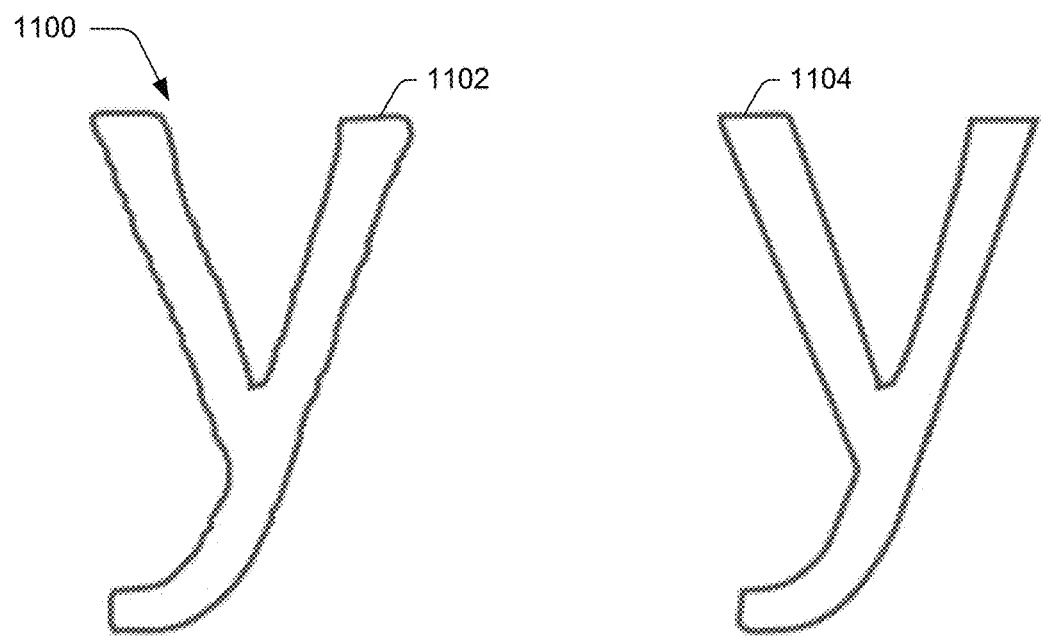
FIG. 11 depicts an example of a comparison of a contour generated from a raster object and a reconstructed Bezier path of a stylized vector object.
Figure 12:
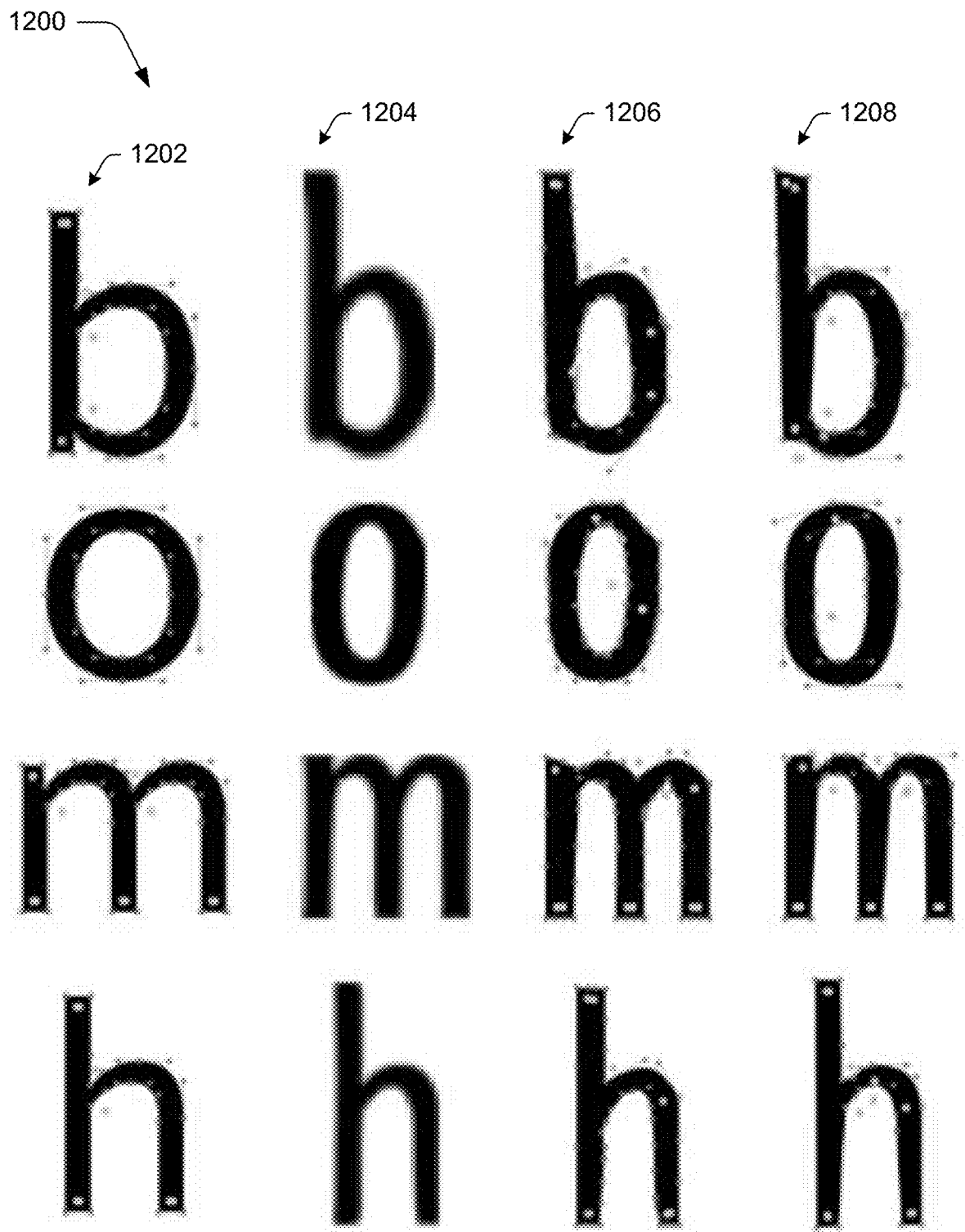
FIG. 12 depicts a comparison of anchor point generation.
Figure 13:
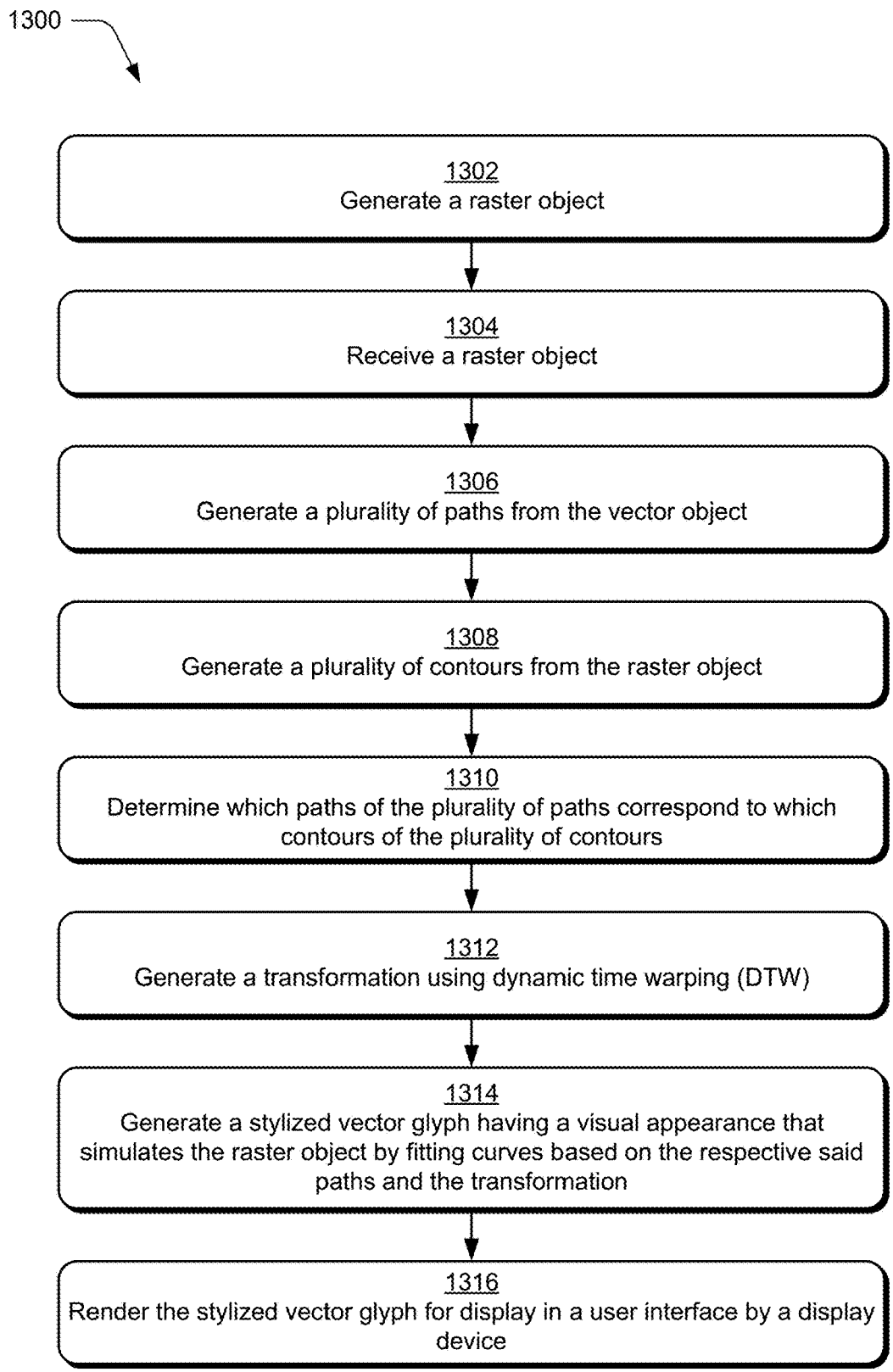
FIG. 13 is a flow diagram depicting a procedure in an example implementation of vector object stylization from raster objects.

FIG. 2 depicts a system 200 in an example implementation showing operation of the vector object stylization system 116 in greater detail. FIG. 3 depict a system 300 showing operation of a transformation generation module of the vector object stylization system 116 of FIG. 2 in greater detail. FIG. 4 depicts a system 400 in an example implementation showing operation of a reconstruction module of FIG. 3 in greater detail. FIG. 5 depicts an example 500 of curves and contours extracted from a vector object and raster object, respectively. FIG. 6 depicts an example 600 of closest point matching. FIG. 7 depicts an example 700 of progressive band closest point matching. FIG. 8 depicts an example 800 of mapping of X gradients between a curve of a vector object and a contour of a raster object, respectively. FIG. 9 depicts an example 900 of mapping of smoothed gradients between curves of a vector object and contours of a raster object, respectively. FIG. 10 depicts an example 1000 of a one-to-many mapping between a curve of a vector object and a contour of a raster object, respectively. FIG. 11 depicts an example 1100 of a comparison of a contour generated from a raster object 118 and a reconstructed Bezier path of a stylized vector object 122. FIG. 12 depicts a comparison 1200 of anchor points. FIG. 13 depicts a procedure 1300 in an example implementation of vector object stylization from raster objects.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-13.

To begin in this example, a raster stylization system 126 is employed to generate a raster object 118 (block 1302). In a first instance, a user interface module 202 is configured to output a user interface 110, e.g., to display a rendered output of the vector object 120. Edits are then received to pixels of this rendered object, which forms the raster object 118. In another instance, a machine-learning model 128 that is trained to impart particular stylizations is employed to generate the raster object 118.

Training of the machine-learning model 128 includes use of training samples to learn particular visual stylizations (e.g., angular, weight, italics) as well as semantic stylizations (e.g., comic, sad, delicate). Once trained, the machine-learning model 128 is configured to impart these stylizations to an input, e.g., pixels rendered from the vector object 120. Other examples are also contemplated in which the raster object 118 is not obtained through editing a rendered output of the vector object 120. For instance, the raster object 118 is generated and a search performed (e.g., automatically through object recognition or manually through interaction with a user interface 110) to locate the vector object 120 that is to start as a beginning point for generating the stylized vector object 122.

The raster object 118 is then received by the vector conversion system 130 (block 1304) in order to generate the stylized vector object 122. To do so, a path generation module 204 is employed to generate a plurality of paths 206 from the vector object 120 (block 1306). The path generation module 204 separates constituent paths 206 used to form the vector object 120, e.g., as Bezier curves. In a vector glyph example, glyphs are configurable in a variety of ways, such as paths 206 composed of lines and curves that may be compound, disjoint, and so forth. Accordingly, the path generation module 204 separates these paths 206 and the following techniques operate on these paths 206 one at a time.

A contour detection module 208 is also employed by the vector conversion system 130 to generate a plurality of contours 210 from the raster object 118 (block 1308). The contour detection module 208, for instance, monochromatizes the raster object 118 and upsamples it to a predefined resolution, when appropriate. The contours 210 are generated from the raster object 118 by first detecting a boundary between pixels of the raster object 118 with pixels of a background, e.g., of the user interface 110, a digital image that includes the raster object 118, and so forth. A variety of techniques are usable to detect this boundary, an example of which is described by G. Bradski, The Open CV Library, *Dr. Dobb's Journal of Software Tools*, 2000, the entire disclosure of which is hereby incorporated by reference in its entirety. This boundary is then converted into a series of connected segments.

Thus, the path generation module 204 outputs a collection of paths 206 and the contour detection module 208 outputs a collection of contours 210. However, the paths 206 may follow an ordering that differs from an ordering employed by the contours 210. To address this, a correspondence detection module 212 is employed to determine which paths of the plurality of paths 206 correspond to which contours 210 of the plurality of contours (block 1310). In order to establish this correspondence, the correspondence detection module 212 employs a location and size detection module 214 to detect location and/or size of the paths 206 and contours 210. For this, the correspondence detection module 212 first ensures that the vector object 120 is scaled to have a size that corresponds to a size of the raster object 118 using a scaling module 216. In practice, it has been found that a moderate resolution of one hundred twenty-eight by one hundred twenty-eight pixels operates well in this scenario. Correspondence between the paths 206 and contours 210 is used to output an ordered list 218, which are individually provided as inputs to a transformation generation module 220 to generate transformations 222 that map the paths 206 to respective contours 210.

The transformation generation module 220 is configured to generate the transformation 222 such that, when applied to a path 220, causes output of a visual appearance that approximates a visual appearance of the raster object 118. As shown in an example 500 of FIG. 5, the paths 206 of the vector object 120 are formed from a sequence of long Bezier curves (e.g., cubic, quadratic, linear, etc.) whereas the contours 210 of the raster object 118 are formed as a series of relatively smaller segments.

In order to perform dynamic time warping, correspondence between start and end points of both inputs is determined such that given a correspondence between starting and terminating points in both inputs, the transformation 222 is a mapping of each point in between from the paths and contours. In some instances, the vector object 120 is formed as a closed path, e.g., as a glyph. Accordingly, a determination of correspondence by a start point identification module 302 of start points 304 is enough as end points are the points immediately preceding the start points. Therefore, the transformation generation module 220 is configured to locate a point in the paths 206 whose fixed correspondence results in a least amount of error in the transformation 222.

Although a brute force search may be performed by the start point identification module 302 of each point combinations between the paths 206 and the contours 210, this consumes significant amounts of computational resources and as a result is not performable in real time. Superimposing the paths 206 and the contours 210 by the start point identification module 302 is also usable to find the contour point closest to the path point assuming a minimum amount of transformation such that matching these points minimize a global error in the transformation 222. However, this fails in instances of stylizations (e.g., angular, italics) that bring a distant point close to an unrelated one. As shown in FIG. 6, for example, a vector object 120 and a raster object 118 are illustrated in which the raster object 118 is an angled version of the vector object 120. This causes incorrect starting point matching 602.

Accordingly, in another example 700 illustrated using first, second, third, and fourth stages 702, 704, 706, 708 in FIG. 7 the start point identification module 302 employs a progressive technique. This technique fixes a point (e.g., a first point in the path 206) and finds a best corresponding point in a superimposed contour 210 by gradually increasing a search radius around the fixed point from the path 206. The start point identification module 302, for instance, begins at a relatively narrow radius (e.g., five pixels) at the first stage 702 and examines each point from the contour 210 within that radius. A corresponding error for each run (i.e., stage) is recorded, and a contour point with a smallest amount of error is chosen. The radius is increased by a predefined amount (e.g., five pixels again) and each point from the contour 210 between the previous radius and the current radius is examined, e.g., between five and ten pixels. If the amount of error is reduced in this band, the process continues until a threshold amount is reached, e.g., five iterations which results in a search radius of twenty-five pixels in the one hundred and twenty-eight by one hundred and twenty-eight resolution example above. Otherwise, the correspondence having a least amount of error is returned as the start point 304.

Once the start points 304 are determined, the dynamic time warping module 132 is employed to generate the transformation 222 using dynamic time warping (DTW). The transformation 222 is configured to align respective paths 206 with corresponding contours 210 (block 1312) from the ordered list 218. In an implementation, the paths 206 and the contours 210 are treated as a flat array of points, even though the paths may be closed, e.g., for vector glyphs. A sampling module 306 is first employed to generate sets of sampled points 308 from the paths 206 and the contours 210, respectively, through uniform sampling. From the previous stage, the start points 304 are already determined. Thus, the sampled sets of points are rotated to arrange the start points 304 "at the front" and as such positions the end points last. Therefore, the mapping module 310 is used to generate a map 312 of correspondences for the sampled points 308 in between the start and end points.

In some instances, location data of the sampled points 308 is not usable, directly, to achieve an accurate result because the contours 210 are an approximation of the raster object 118. To address this, the mapping module 310 employs a hyperparameter processing module 314 to generate hyperparameters from the location data for processing using the one-to-many mapping supported by dynamic time warping. Examples of hyperparameters include gradients 316 and angles 318.

Regarding gradients 316, the hyperparameter processing module 314 computes a deviation (e.g., in both X and Y dimensions) for each point in both sets of points from a preceding point. This hyperparameter captures a rate of change in both X and Y dimensions at each point. Therefore, when generating the transformation 222 dynamic time warping matches peaks (in X and Y deviations) of a first set of points sampled from the paths 206 with peaks of a second set of points samples from the contours 210, matches troughs, plateaus, and so on.

Regarding angles 318, the hyperparameter processing module 314 examines angles to determine a mapping from the paths 206 to the contours 210. In one example, an angle of tangents (to the paths 206 or contours 210) is used to generate the map 312. The hyperparameter processing module 314 may also examine angles subtended by these points at the origin, normal angles to these points, and so on to determine how to map the sampled points from the paths 206 to the contours 210. Hyperparameters are also usable in combination.

In some instance, hyperparameters such as gradients 316 and angles 318 exhibit a high degree of variation in sampled points from contours 210. This is because the contours 210 are an approximation from the raster object 118 and thus typically include zigzags and are noisy. As shown in a example 800 of FIG. 8, for instance, a dynamic time warping correspondence map computed for an X gradients for a path 206 and contour 210 has a significant number of localized peaks and troughs for the contours 210, causing inaccurate results.

Accordingly, in an implementation the gradients 316 are smoothed before processing using dynamic time warping, an example of a smoothing filter is as follows:

$$C_i = 0.8 * + C_i + 0.1 * C_{i-1} + 0.1 * C_{i+1}$$

where "$C_i$" is an X or Y gradient value at point "i". For boundary cases, the process wraps around for the "(i−1)th" and "(i+1)$^{th}$" point. This process of smoothing is repeatable for a predefined number of iterations to settle local peaks and troughs into a plateau, e.g., for twenty iterations.

In some instances, an example 900 of which is shown in FIG. 9, multiple mappings per point are generated which is illustrated as a region in the mapping space where there is no clear choice for correspondence because each of the alternatives are generally equivalent. This may also happen because the number of points in both sets of points is not the same. In order to resolve this ambiguity, the mapping module 310 takes a left-most and right-most occurrence of each one-to-many correspondence, and finds an error in output as a result of resolving the ambiguity to select of one of them. In other words, the mapping module 310 selects either the left-most or the right-most point, whichever gives less error. This resolves the map 312 generated using dynamic time warping, which is then passed as an input to a reconstruction module 320.

The reconstruction module 320 is configured to generate the stylized vector object 122 to have a visual appearance that simulates the raster object 118 by fitting curves based on the respective paths 206 and the transformation 222 (block 1314). The map 312 generated above is a transformation 222 of sampled points from the paths 206 taken from the vector object 120 to samples points from contours 210 taken from the raster object 118. Recall, contours 210 are rough approximations. Thus, in order to obtain a high quality vector path of the stylized vector object 122, a curve selection module 402 separates the sample points curve-by-curve for the paths 206. A transformation module 404 is then employed to apply the transformation 222 to the sampled points 308 to obtained a sampled result curve 406. A curve fitting module 408 is then utilized to generate a vector curve 410 using curve fitting, and once generated, are connected together to ensure continuity and that the stylized vector object 122 approximates the raster object 118, visually.

To do so, the curve fitting module 408 is configured to employ a variety of different techniques to fit the curves. When a linear curve is detected by the curve fitting module 408 from the vector object 120, for instance, line fitting 414 is performed unless there is a clear deviation in the raster object 118 to rectify minor rasterization and contour defects. This ensures that the straight lines in glyphs like "K" remain so, unless there is a clear intent (determined by a threshold) that the corresponding contour in the raster object 118 is higher order than a line segment. For quadratic and cubic Bezier curves that are detected in the vector object 120, "pure" curve fitting 416 is performed. In this way, the vector object 120 guides which curve fitting technique is used.

Once the vector curves 410 are reconstructed, a continuity module 412 is utilized to perform a continuity match of the output vector curves 410 with the corresponding input vector curves 410. This ensures the continuities (e.g., "C0," "C1," and "G1" continuities) are maintained. Because continuity matching can result in modification to the vector curve 410, these operations may be performed iteratively till the desired level of accuracy is attained, i.e., an amount of error is reduced below a threshold amount.

An error determination module 418, for instance, is configured to determine an amount of error 420 exhibited by vector curves 410 generated by the curve fitting module 408. Once an vector curve 410 is generated as a Bezier path by the curve fitting module 408, for instance, the error determination module 418 estimates how closely this curve is able to reproduce a corresponding contour 210 in the raster object 118.

To do so as shown in the example 1100 of FIG. 11, two bitmap images are generated. The first bitmap image 1102 includes the contour 210 and the second bitmap image 1104 has a reconstructed Bezier path from the vector curve 410 plotted as a same scale. An error computation technique, such as Root Mean Square Error (RMSE) is then computed using these two bitmap images as a measure of accuracy in approximation of the raster object 118. This error 420 is "fed back" for use in assisting detection of a start point 304 by the start point identification module 302, resolve a one-to-many ambiguity by the mapping module 310, and so forth. This is performable for a plurality of iterations, with the error used to select a particular iteration (i.e., vector curves 410) that are "optimal" as minimizing the error.

Once a vector curve 410 is selected from these plurality of iterations, a result stitching module 422 is configured to produce the stylized vector object 122 by arranging the vector curves 410 in a same order and configuration as indicated by the vector object 120. If arranged in a compound path setup in the vector object 120, for instance, the vector curves 410 are arranged in a similar manner by the result stitching module 422. After stitching, the stylized vector object 122 is rendered for display in a user interface 110 by a display device 112 (block 1316).

FIG. 12 depicts an example 1200 comparing source vector glyphs 1202, stylized raster objects 1204, image traces 1206, and stylized vector objects 1208 computed using the techniques. Image trace is a conventional solution to generate vector objects. However, a number of anchors produced by image trace is 30% greater that the techniques described herein because image trace is opaque and does not attempt to match a topology. In the techniques described herein, however, the raster object 118 is converted into a stylized vector object 122 by transforming the vector object 120 and thus the topologies match.

Example System and Device

Figure 14:
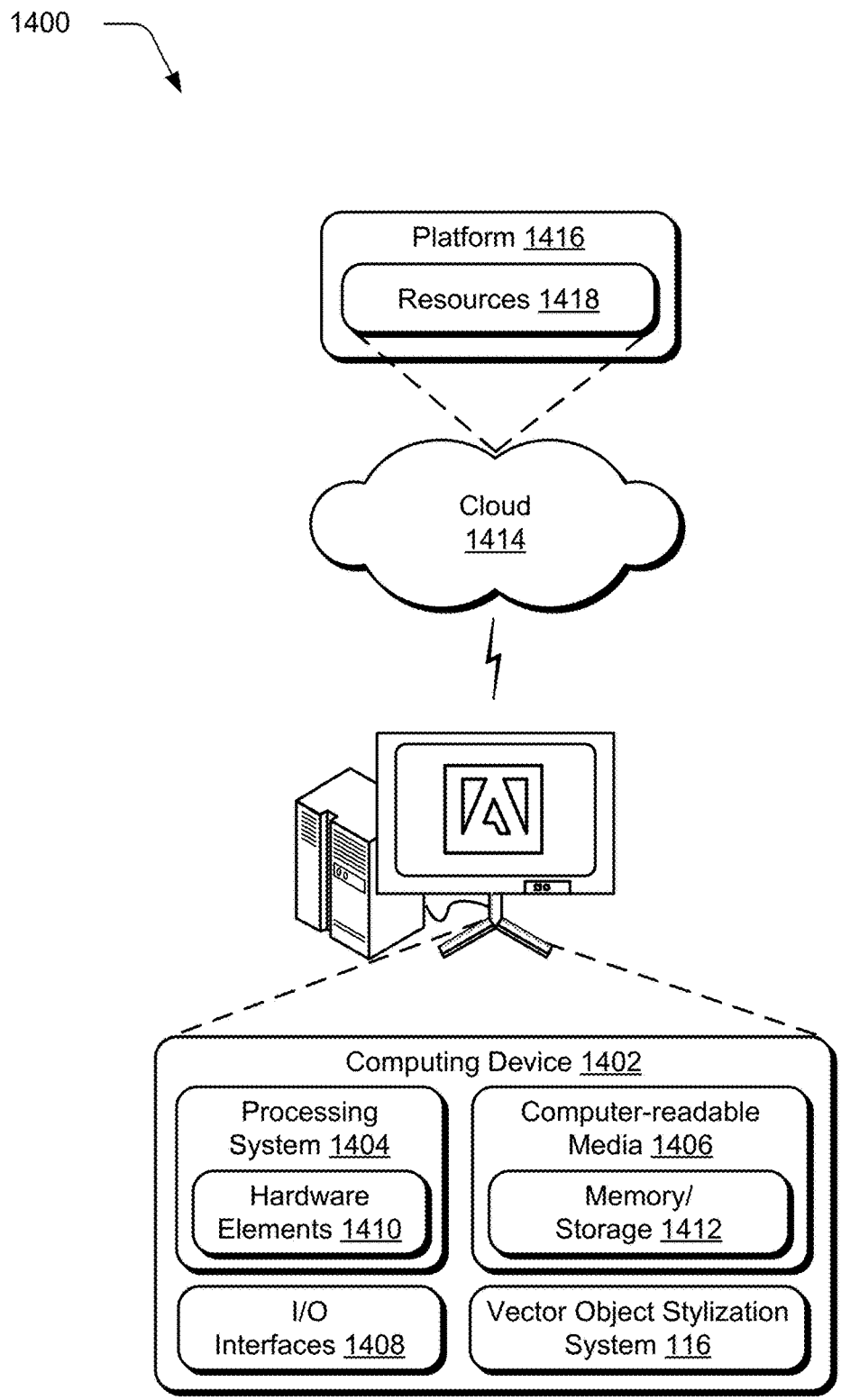
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the vector object stylization system 116. The computing device 1402 is configurable, for example, as a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, a raster object generated by editing an output of a vector glyph of a font;
   generating, by the computing device, a plurality of paths from the vector glyph and a plurality of contours from the raster object;
   determining, by the computing device, which paths of the plurality of paths correspond to which contours of the plurality of contours;
   generating, by the computing device, a transformation using dynamic time warping (DTW), the transformation configured to align respective said paths with corresponding said contours having sequences of different lengths;
   generating, by the computing device, a stylized vector glyph having a visual appearance that simulates the raster object by fitting curves based on the respective said paths and the transformation; and
   rendering, by the computing device, the stylized vector glyph for display in a user interface by a display device.

2. The method as described in claim 1, wherein the plurality of paths are configured as Bezier curves.

3. The method as described in claim 1, wherein the raster object is generated based on one or more user inputs received via the user interface to edit a rendered output of the vector glyph as displayed in the user interface.

4. The method as described in claim 1, wherein raster object is generated by stylizing an output of the vector glyph using a machine-learning model.

5. The method as described in claim 1, wherein the generating the plurality to contours from the raster object includes:
  detecting a boundary between pixels of the raster object and pixels from a background of the user interface; and
  generating the plurality of contours based on the boundary.

6. The method as described in claim 1, wherein the dynamic time warping (DTW) is configured to generate the transformation as a one-to-many mapping between sets of points sampled from respective said paths and sets of points sampled from corresponding said contours.

7. The method as described in claim 6, wherein the dynamic time warping is based on hyperparameters including X/Y gradients or angles derived from the sets of points sampled from respective said paths and the sets of points sampled from corresponding said contours.

8. The method as described in claim 1, wherein the generating is performed for a plurality of said transformations and further comprising selecting the transformation from the plurality of said transformation based on an error computation.

9. The method as described in claim 1, wherein the generating the stylized vector glyph employs a continuity that defines transitions between adjacent said curves.

10. The method as described in claim 1, wherein the generating is performed for a plurality of said stylized vector glyphs and further comprising selecting a stylized vector glyph from the plurality of said stylized vector glyphs based on an error computation and wherein the rendering is performed for the selected said stylized vector glyph.

11. A system comprising:
  a path generation module implemented by a processing device to generate a plurality of paths from a vector object;
  a contour generation module implemented by the processing device to generate a plurality of contours from a raster object generated by editing an output of the vector object;
  a correspondence detection module implemented by the processing device to determine which paths of the plurality of paths correspond with which contours of the plurality of contours;
  a transformation generation module implemented by the processing device to generate a transformation based on a one-to-many mapping between sets of points of respective said paths and sets of points of corresponding said contours having sequences of different lengths;
  a curve fitting module implemented by the processing device to fit curves to the sets of points of the respective said paths based on the transformation; and
  a result stitching module implemented by the processing device to generate a stylized vector object having a visual appearance that simulates a visual appearance of the raster object by connecting the curves using continuity-based stitching.

12. The system as described in claim 11, further comprising a raster stylization system implemented at least partially in hardware of a computing device to generate the raster object as a stylization of a rendered output of a vector object.

13. The system as described in claim 12, wherein the raster stylization system generates the raster object using a machine-learning model.

14. The system as described in claim 11, wherein the plurality of paths are configured as Bezier curves.

15. The system as described in claim 11, wherein the contour generation module is configured to generate the plurality of contours from the raster object by:
  detecting a boundary between pixels of the raster object and pixels from a background of a user interface; and
  generating the plurality of contours based on the boundary.

16. The system as described in claim 11, wherein the one-to-many mapping is performed using dynamic time warping (DTW).

17. The system as described in claim 16, wherein the dynamic time warping is based on hyperparameters including X/Y gradients or angles derived from the sets of points sampled from respective said paths and the sets of points sampled from corresponding said contours.

18. The system as described in claim 11, wherein the transformation generation module is configured to generate a plurality of said transformations and select a transformation from the plurality of said transformation based on an error computation.

19. The system as described in claim 11, wherein the result stitching module is configured to generate a plurality of said stylized vector objects and further comprising an error determination module configured to select a stylized vector object from the plurality of said stylized vector objects based on an error computation.

20. A system comprising:
  means for generating a plurality of paths from a vector object;
  means for generating a plurality of contours from a raster object detected based on a boundary of pixels of the raster object and pixels from a background;
  means for determining which paths of the plurality of paths correspond to which contours of the plurality of contours;
  means for generating a transformation using dynamic time warping (DTW), the transformation configured to align respective said paths with corresponding said contours having sequences of different lengths; and
  means for generating a stylized vector object having a visual appearance that simulates the raster object by fitting curves to the respective said paths based on the transformation.

* * * * *